US007641290B2

(12) United States Patent
Miller

(10) Patent No.: US 7,641,290 B2
(45) Date of Patent: Jan. 5, 2010

(54) SHUTTLE VALVE FOR BI-ROTATIONAL POWER UNITS

(75) Inventor: Steven James Miller, Loves Park, IL (US)

(73) Assignee: Haldex Hydraulics Corporation, Rockford, IL (US)

( * ) Notice: Subject to any disclaimer, the term of this patent is extended or adjusted under 35 U.S.C. 154(b) by 445 days.

(21) Appl. No.: 11/418,047

(22) Filed: May 4, 2006

(65) Prior Publication Data

US 2006/0248884 A1 Nov. 9, 2006

Related U.S. Application Data

(60) Provisional application No. 60/677,793, filed on May 4, 2005.

(51) Int. Cl.
*B60T 8/38* (2006.01)

(52) U.S. Cl. ....................... 303/117.1; 303/10; 180/441

(58) Field of Classification Search ................. 180/403, 180/441, 442; 60/473–486; 137/107–112; 303/3, 7, 10, 11, 116.4, 117.1
See application file for complete search history.

(56) References Cited

U.S. PATENT DOCUMENTS 4,640,094 A * 2/1987 Wittren ....................... 60/385
5,197,283 A * 3/1993 Kagiwada et al. ............. 60/464
5,758,739 A * 6/1998 Voss et al. .................. 180/403
6,216,456 B1 * 4/2001 Mitchell ...................... 60/452
6,550,566 B1 * 4/2003 Engelbrecht ................ 180/432
6,568,499 B2 * 5/2003 Nakazawa et al. .......... 180/422
6,880,668 B2 * 4/2005 Sakaki et al. ............... 180/441
6,953,102 B2 * 10/2005 Kurata et al. ................ 180/442
7,174,988 B2 * 2/2007 Sasaki et al. ................ 180/422
7,254,945 B1 * 8/2007 Sakai et al. .................... 60/476
2003/0178241 A1 * 9/2003 Yokota et al. ............... 180/441

* cited by examiner

*Primary Examiner*—Christopher P Schwartz
(74) *Attorney, Agent, or Firm*—St. Onge Steward Johnston & Reens LLC

(57) ABSTRACT

A valve has a valve body with first and second intake passages, first and second supply passages and a reservoir return passage defined therein. A shuttle member is movable within the valve body between a first flow position and a second flow position. In the first flow position, the shuttle member defines a first fluid flow path between the first intake passage and the first supply passage and a second fluid flow path between the second supply passage and the reservoir return passage. In the second flow position, the shuttle member defines a third fluid flow path between the second intake passage and the second supply passage and a fourth fluid flow path between the first supply passage and the reservoir return passage. The valve is useful in a bi-directional hydraulic power system having at least one hydraulic component, a reservoir for hydraulic fluid, and a bi-directional pump.

18 Claims, 4 Drawing Sheets

SHUTTLE VALVE FOR BI-ROTATIONAL POWER UNITS

CROSS-REFERENCE TO RELATED APPLICATIONS

This patent application claims the benefit of, under Title 35, United States Code, Section 119(e), U.S. Provisional Patent Application No. 60/677,793, filed May 4, 2005.

FIELD OF THE INVENTION

The present invention relates generally to hydraulic power systems, and more particularly to bi-directional hydraulic power systems.

BACKGROUND OF THE INVENTION

A bi-directional hydraulic power system may comprise a reservoir, a bi-directional pump, at least one hydraulic component that receives and returns hydraulic fluid, and a plurality of fluid lines connecting these components in fluid communication with one another. By driving the bi-directional pump to rotate in a first direction, hydraulic fluid is moved into a first part of the hydraulic component to apply hydraulic pressure thereto, thereby causing the hydraulic component to perform a movement. This forces hydraulic fluid to be expelled from a second part of the hydraulic component to circulate within the hydraulic power system. Similarly, driving the pump in the opposite direction will move hydraulic fluid into the second part of the hydraulic component, causing the component to move in the opposite manner and to expel fluid from its first part into the hydraulic power system.

In most bi-directional hydraulic power units, hydraulic fluid flow returning to the system from the hydraulic component or components is passed directly to one of the pump inlets. If air is entrained in the return flow of hydraulic fluid, the air will be passed back into the pump and will not be vented to the atmosphere from the hydraulic system. Air in the hydraulic system causes several problems, including jerky movement of components, "spongy" components, air lock of pilot operated check valves, as well as noisy pumps and valves.

Previous attempts to obviate this problem have included pre-filling the hoses to be used in the hydraulic system, and bleeding air from the hydraulic system. Pre-filling hoses and bleeding air often results in spillage of hydraulic oil which can be an environmental hazard if not contained properly. In addition, a user must generally bleed the air from the highest points in the hydraulic power system, which points are not always accessible once the system has been installed in the application. Furthermore, both of these methods are manual and time consuming.

Another method that has been used in the prior art is to install air vent cartridge valves in the hydraulic system. However, such air vent cartridge valves must be external to the power unit and require additional connections. Furthermore, such an approach requires two valves, one each side of the hydraulic component, which adds additional cost to the system. Moreover, air vent cartridge valves are meant to work on the high-pressure side of the system, not on the low-pressure return side, and therefore will not allow air to be purged from the return flow of hydraulic fluid. Thus, hydraulic fluid having air entrained therein will still be passed back to the inlet of the pump, and pump and valve noise, as well as possible air lock of pilot operated check valves, remains a problem

SUMMARY OF THE INVENTION

A hydraulic control circuit for a hydraulic actuator and the circuit includes a bi-directional pump to transfer fluid between a reservoir and a valve controlling movement of the actuator. The pump has a pair of ports and is operable in a first mode where ingress of fluid from the reservoir to the pump is provided at one of the ports and egress of fluid from the pump to the valve is provided at the other port and operable in a second mode where ingress of fluid is provided at the other port and egress is provided at the one port. The valve has a first position when the pump is in the first mode in which the other port is connected to one side the of the actuator. The other side of the actuator is connected directly to the reservoir to induce movement of the actuator in a first direction and has a second position when the pump is in the second mode in which the one port is connected to the other side of the actuator. The one side is connected directly to the reservoir to induce movement in a second direction. Fluid expelled from the actuator by movement thereof thereby passes through the reservoir prior to delivery to a respective one of the ports of the pump.

According also to the present invention, there is provided a hydraulically actuated shuttle valve having a body with a pair of supply ports, and a drain port located between the supply ports. A spool is located in the body and has a pair of lands, each associated with a respective one of the supply ports to control flow therethrough. A pair of inlet ports supply pressurised fluid to the spool to act on opposite ends of the spool and induce movement to either a first position in which one of the inlet ports is connected to one of the supply ports and the other supply port is connected to the drain or a second position in which the other inlet port is connected to the other supply port and the are supply port is connected to the drain.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF THE INVENTION

Figure 1:
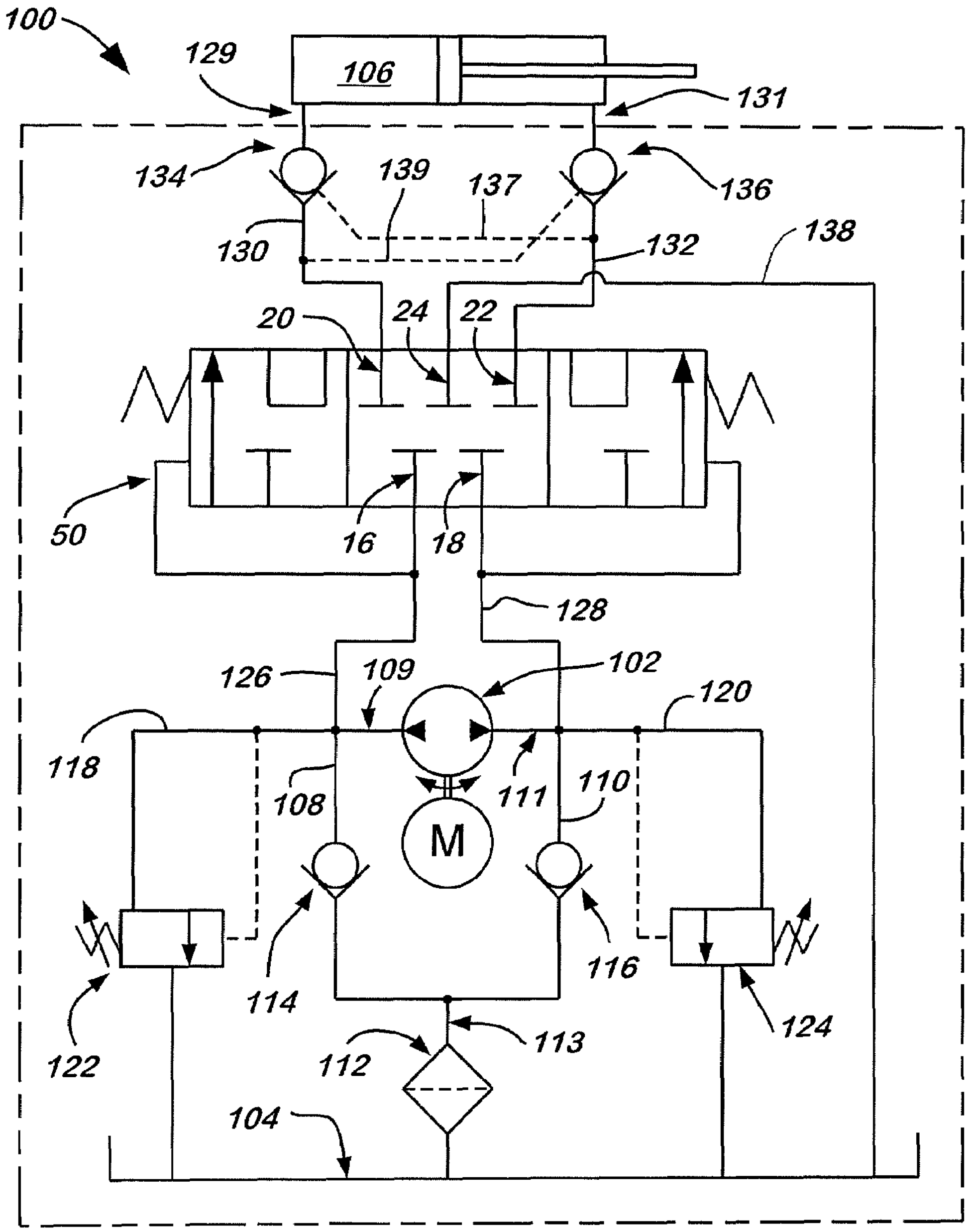
FIG. 1 is a schematic diagram of an embodiment of a bi-directional hydraulic power system.

Referring first to FIG. 1, a schematic diagram of a preferred embodiment of a hydraulic power system 100 is shown. The hydraulic power system 100 comprises a bi-directional pump 102, a valve 50, a reservoir 104, and a hydraulic actuator 106. Preferably, the hydraulic actuator 106 is a double-acting cylinder, as shown in FIG. 1, although numerous other hydraulic actuators 106, such as rotary actuators, can be used without departing from the scope of the present invention.

The bi-directional pump 102 driven by a motor M in either direction of rotation and is in fluid communication with the reservoir 104 by way of first and second reservoir supply lines 108 and 110, respectively, and filter 112. The first reservoir supply line 108 is in fluid communication with a first pump connection port 109 on the bi-directional pump 102, and the second reservoir supply line 110 is in fluid communication with a second pump connection port 111 on the bi-directional pump 102. Both reservoir supply lines 108, 110 are in fluid communication with a filter line 113, in which the filter 112 is disposed and which is in fluid communication with the reservoir 104.

The reservoir supply lines 108 and 110 have check valves 114 and 116, respectively, to inhibit hydraulic fluid from being delivered from the pump 102 back into the reservoir 104. The pump connection ports 109, 111 of the bi-directional pump 102 are also connected, through relief lines 118 and 120, to relief valves 122 and 124, respectively. When opened by pressure exceeding a specified amount, relief valves 122 and 124 direct hydraulic fluid into the reservoir 104 and thereby prevent damage to the bi-directional pump 102. Although the relief valves 122 and 124 are shown in FIG. 1 as being pilot-operated relief valves, any suitable relief valve may be used.

The pump connection ports 109, 111 of the bi-directional pump 102 are further connected to the valve 50. The valve 50 has a first intake passage 16, a second intake passage 18, a first supply passage 20, a second supply passage 22, and a reservoir return passage 24. The first pump connection port 109 is connected in fluid communication with the first intake passage 16 of the valve 50 by a first pump delivery line 126. Similarly, the second pump connection port 111 is connected in fluid communication with the second intake passage 18 of the valve 50 by a second pump delivery line 128.

The first supply passage 20 of the valve 50 is connected in fluid communication with a first fluid supply port 129 on the actuator 106 by a first component delivery line 130. Similarly, the second supply passage 22 of the valve 50 is connected in fluid communication with a second fluid supply port 131 on the hydraulic component 106 by a second component delivery line 132. Component delivery lines 130 and 132 have pilot-operated check valves 134 and 136, respectively, to permit hydraulic fluid to flow into and out of the hydraulic actuator 106 when the bi-directional pump 102 is operating, and to inhibit hydraulic fluid from escaping from the hydraulic actuator 106 into the hydraulic power system 100 when the bi-directional pump 102 is not operating. Pilot-operated check values 134 and 136 have pilot signal lines 137 and 139, respectively.

The reservoir return passage 24 of the valve 50 is connected directly to the reservoir 104 by a reservoir return line 138 so it is not in communication with the pump 102 except through the reservoir. The reservoir 104 is vented to the atmosphere, thereby permitting air entrained in the hydraulic fluid returning from the hydraulic component 106 to escape before the hydraulic fluid is again drawn into the bi-directional pump 102. Thus, hydraulic fluid being drawn from the reservoir 104 into the bi-directional pump 102 will be substantially free of entrained air.

Figure 2:
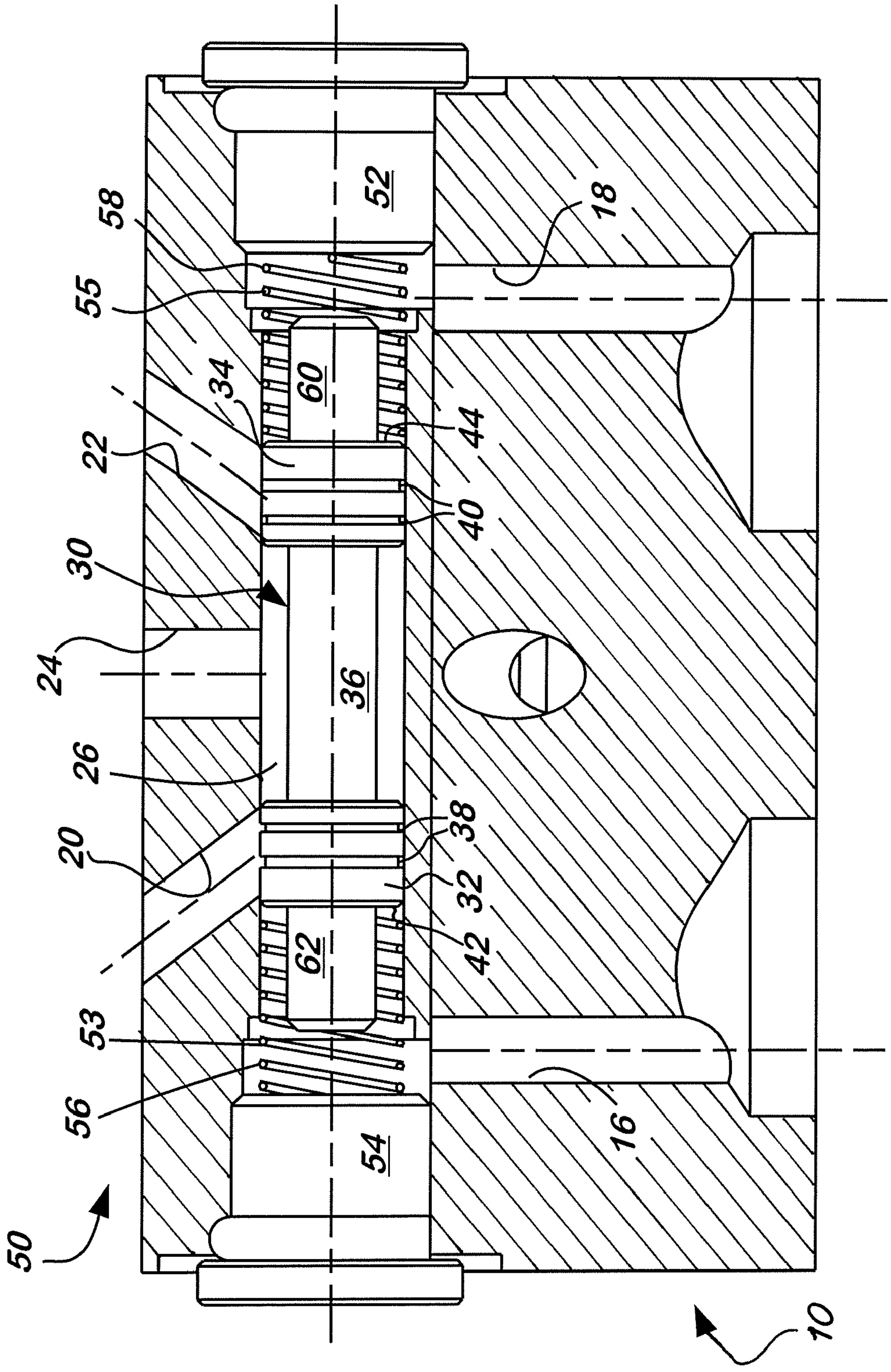
FIG. 2 is a cross-sectional view of an embodiment of a valve, with the shuttle member of the valve shown in a rest position.

Now referring to FIG. 2, a cross-sectional view of a particular preferred embodiment of a valve 50 is shown and described. The preferred embodiment of the valve 50 comprises a valve body 10 and a shuttle member 30.

The first intake passage 16, second intake passage 18, first supply passage 20, second supply passage 22, and a reservoir return passage 24 are defined in the valve body 10, and are in fluid communication with a bore 26 that is also defined in the valve body 10.

The shuttle member 30 preferably comprises two lands 32 and 34 separated by an intermediate portion 36. The lands 32, 34 engage the wall or walls of the bore 26 to define a sliding fit between the bore 26 and the bore-engaging portions 32, 34 of the shuttle member 30. The lands 32, 34 have annular channels 38, 40 defined therein to reduce frictional contact.

The bore 26 extends completely through the valve body 10 and end caps 52 and 54 are installed at the ends of the bore 26 to retain the shuttle member 30 within the bore 26 and define inlet chambers 53, 55. Biasing members 56 and 58 are disposed in the chambers 53, 55 between the end caps 52, 54 and the ends of the shuttle member 30 to bias the shuttle member into a "rest" position as shown in FIG. 2. The biasing members 56, 58 are springs that engage shoulders 42, 44 on the bore-engaging portions 32, 34 of the shuttle member 30. One skilled in the art will appreciate that a suitable single biasing member (not shown) may also be used to bias the shuttle member 30 into the rest position.

As can be seen in FIG. 2, in the rest position the shuttle member prevents fluid communication between the first intake passage 16 and the first supply passage 20 and between the second intake passage 18 and the second supply passage 22. In the rest position, the shuttle member 30 also obstructs fluid communication between the reservoir return passage 24 and both the first intake passage 16 and the first supply passage 20, and between the reservoir return passage 24 and both the second intake passage 18 and the second supply passage 22. Thus, in the rest position the shuttle member 30 inhibits all fluid communication through the valve 50.

Figure 3:
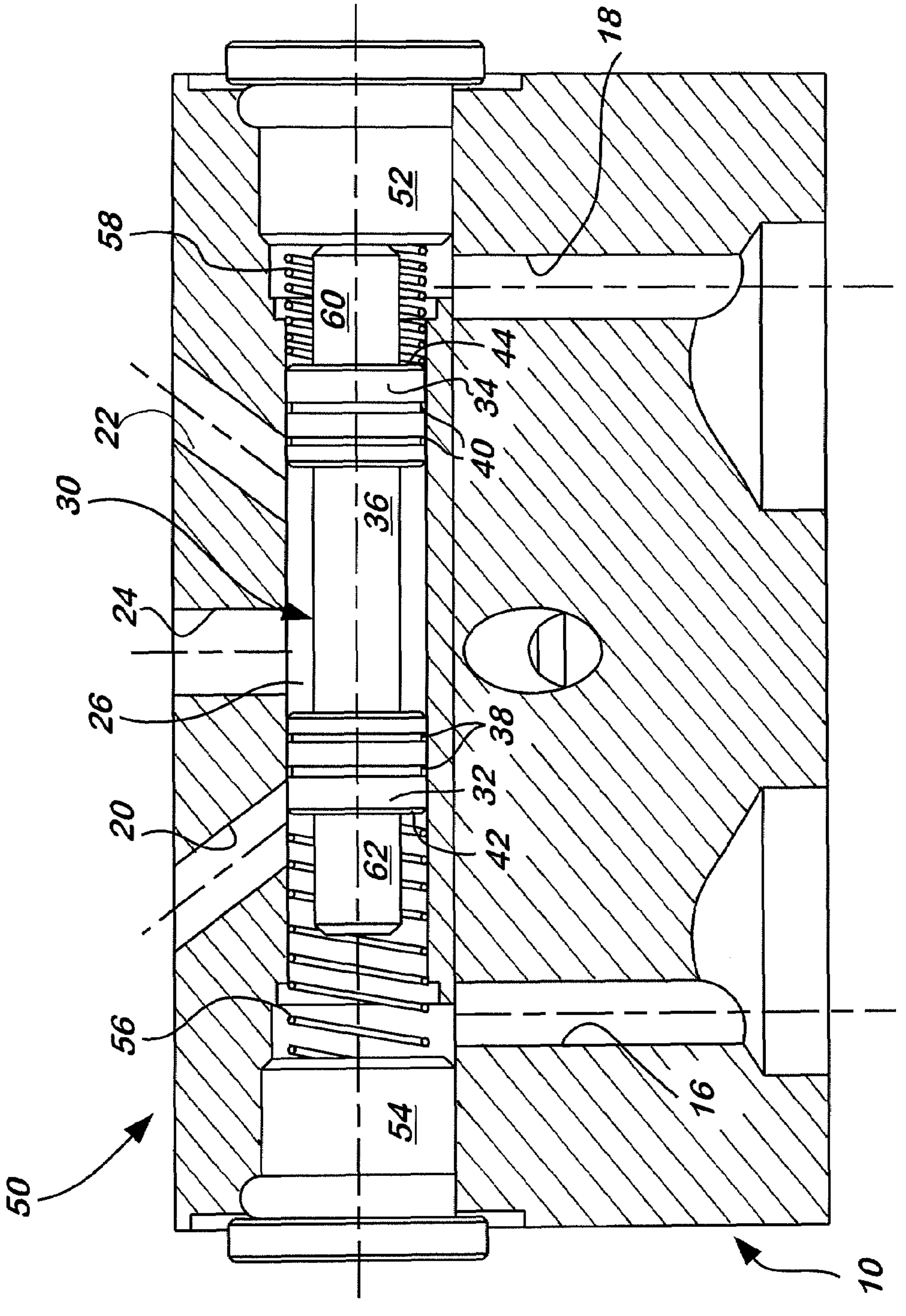
FIG. 3 is a cross-sectional view of an embodiment of a valve, with the shuttle member of the valve shown in a first flow position.
Figure 4:
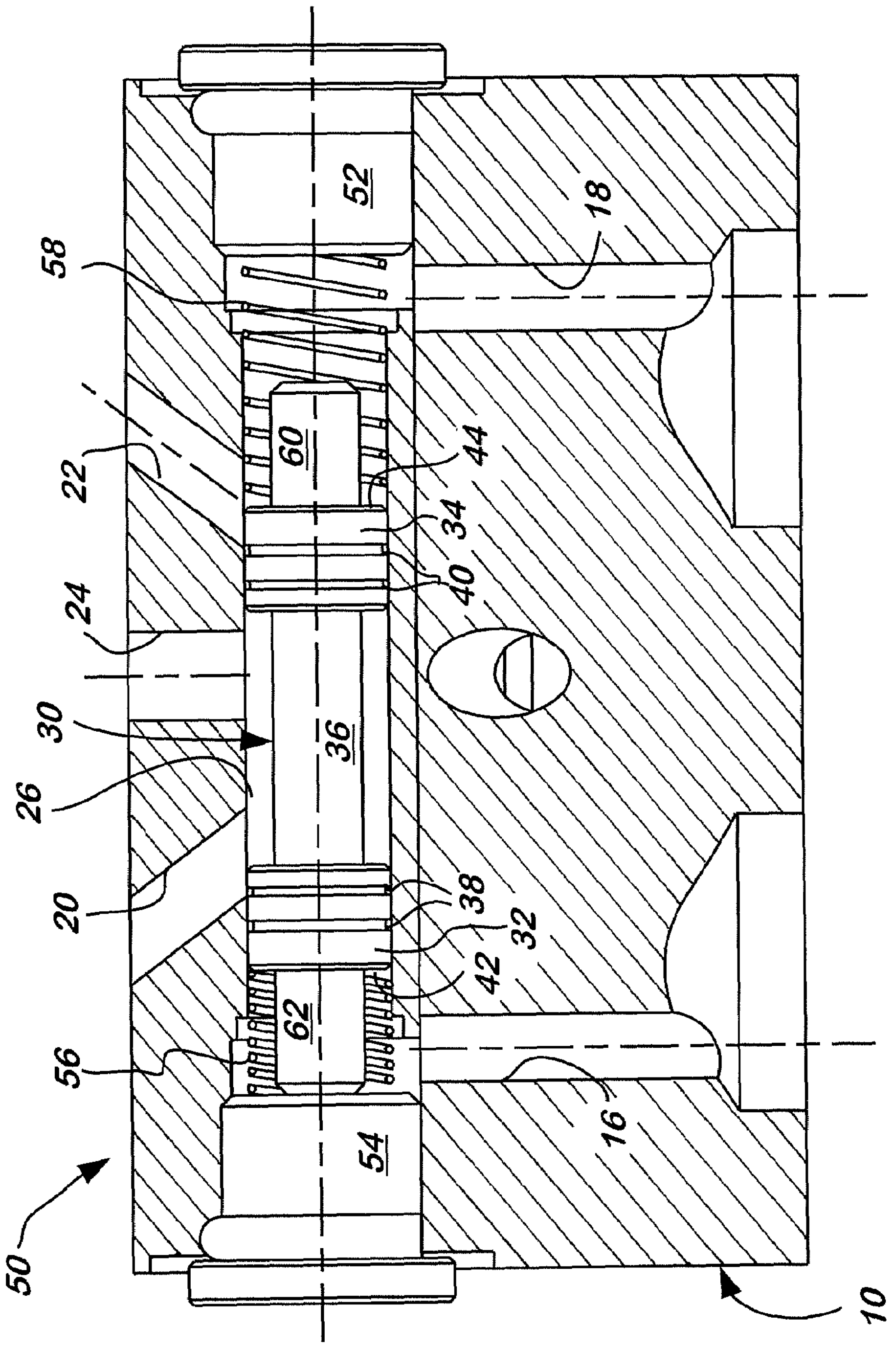
FIG. 4 is a cross-sectional view of an embodiment of a valve, with the shuttle member of the valve shown in a second flow position.

The shuttle member 30 is movable within the bore from the rest position to either a first flow position, as shown in FIG. 3, or a second flow position, as shown in FIG. 4. When the shuttle member 30 is in the first flow position as shown in FIG. 3, the end 60 of the shuttle member 30 abuts the end cap 52 adjacent the second intake passage 18. Thus, the end cap 52 acts as a stop. Similarly, when the shuttle member 30 is in the second flow position, the end 62 of the shuttle member 30 abuts the end cap 54 adjacent the first intake passage 16, so that the end cap 54 acts as a stop.

The operation of the exemplary hydraulic power system 100 will now be explained.

Prior to activation of the bi-directional pump 102, the biasing members 56, 58 maintain the shuttle member 30 in the rest position, as shown in FIG. 3. When the bi-directional pump 102 begins to pump hydraulic fluid in a first direction, it will draw fluid from the reservoir 102 through the filter 112, the filter line 113 and along the second reservoir supply line 110 through check valve 116 and into the second pump connection port 111. This hydraulic fluid enters the bi-directional pump 102 and is pumped out of the first pump connection port 109, with the flow of hydraulic fluid being inhibited from returning to the reservoir 102 along the first reservoir supply line 108 by the check valve 114. Similarly, because the maximum pressure has not been exceeded, the relief valve 122 remains closed, inhibiting flow into the relief line 118. The hydraulic fluid then enters the first pump delivery line 126 and is passed into the first intake passage 16 of the valve 50.

As the hydraulic fluid begins to flow through the first intake passage 16, pressure is applied in the chambers 53 to the end 62 and shoulder 42 of the shuttle member 30, overcoming the force of the biasing member 58 and urging the shuttle member into the first flow position shown in FIG. 3.

In the first flow position, the shuttle member 30 defines a first fluid flow path between the first intake passage 16 and the first supply passage 20. Moreover, in the first flow position, the land 32 obstructs fluid communication through the bore 26 between the reservoir return passage 24 and both the first intake passage 16 and the first supply passage 20. Thus, hydraulic fluid entering the valve 50 through the first intake passage 16 will be directed to exit the valve 50 through the first supply passage 20. Accordingly, hydraulic fluid flowing from the bi-directional pump 102 through the first pump supply line 126 will enter the first intake passage 16 and flow through the first supply passage 20 and the first component delivery line 130 into the first fluid supply port 129 on the hydraulic actuator 106. Fluid flow from the first intake passage 16 toward the reservoir return passage 24 will be obstructed by the land 32.

When hydraulic fluid is introduced into the hydraulic actuator 106 through the first fluid supply port 129, it causes movement of the hydraulic actuator 106 and expels hydraulic fluid into the second component supply line 132 from the second fluid supply port 131.

In the first flow position, the shuttle member 30 also defines a second fluid flow path between the second supply passage 22 and the reservoir return passage 24, and obstructs fluid communication through the bore 26 between the second supply passage 22 and the second intake passage 18. Thus, hydraulic fluid entering the valve 50 through the second supply passage 22 will be directed to the reservoir return passage 24 because the intermediate portion 36 of the shuttle member 30 does not substantially obstruct fluid flow. Therefore, when hydraulic fluid is expelled through the second fluid supply port 131, it will flow through the second component delivery line 132, the second supply passage 22, the reservoir return passage 24 and the reservoir return line 138 into the reservoir 104. Fluid flow from the second supply passage 22 toward the second intake passage 18 will be obstructed by the land 34, inhibiting any hydraulic fluid that may have air entrained therein from returning to the bi-directional pump 102 through the second pump delivery line 128. Instead, this hydraulic fluid is directed to the vented reservoir 104.

Once the bi-directional pump 102 is stopped, the pressure applied to the shuttle member 30 dissipates, and the shuttle member 30 returns to its rest position under the force of the biasing member 58. In this position, further movement of the component 106 is prevented by the check valves 134, 136

When the bi-directional pump 102 begins to pump hydraulic fluid in the opposite direction, hydraulic fluid is drawn from the reservoir 104 through the filter line 113, the filter 112, along the first reservoir supply line 108, through the check valve 114 and into the first pump connection port 109. This hydraulic fluid is then pumped out of the second pump connection port 111, with flow back to the reservoir 104 being inhibited by the check valve 116 and the relief valve 124, which remains closed in the absence of excessive pressure. Thus, the hydraulic fluid is pumped through the second pump delivery line 128 into the second intake passage 18 of the valve 50, applying pressure to the end 60 and shoulder 44 of the shuttle member 30. This pressure overcomes the force applied by the biasing member 56 and urges the shuttle member 30 into the second flow position, as shown in FIG. 4.

In the second flow position, the shuttle member 30 defines a third fluid flow path between the second intake passage 18 and the second supply passage 22, and obstructs fluid communication between the reservoir return passage 24 and both the second intake passage 18 and the second supply passage 22. Hydraulic fluid entering the valve 50 through the second intake passage 18 will therefore be directed to exit the valve 50 through the second supply passage 22, and fluid flow from the second intake passage 18 toward the reservoir return passage 24 will be obstructed by the land 34. Thus, when hydraulic fluid flowing from the bi-directional pump 102 through the second pump supply line 128 enters the second intake passage 18, it will flow through the second supply passage 22 and into the second component delivery line 132. From the second component delivery line 132, the hydraulic fluid flows into the second fluid supply port 131 on the hydraulic component 106, causing movement of the hydraulic component 106 and forcing hydraulic fluid out of the first fluid supply port 129 and into the first component delivery line 130.

In the second flow position, the shuttle member 30 also defines a fourth fluid flow path between the first supply passage 20 and the reservoir return passage 24, and preferably obstructs fluid communication through the bore 26 between the first supply passage 20 and the first intake passage 16. Therefore, when the shuttle member 30 is in the second flow position, hydraulic fluid entering the valve 50 through the first supply passage 20 will be directed to the reservoir return passage 24, since the intermediate portion 36 does not substantially obstruct fluid flow. When movement of the hydraulic component 106 forces hydraulic fluid through the first fluid supply port 129 into the first component delivery line 130, this hydraulic fluid will flow from the first component delivery line 130 into the second supply passage 22, through the reservoir return passage 24 and the reservoir return line 138 into the reservoir 104. Fluid flow from the first supply passage 20 toward the first intake passage 16 will be obstructed by the bore-engaging portion 32. As a result, the returning hydraulic fluid, which may have air entrained therein, is inhibited from returning to the bi-directional pump 102 through the second pump delivery line 128 and is instead directed to the vented reservoir 104.

Again, stopping the bi-directional pump 102 releases the pressure applied to the shuttle member 30, allowing the force applied by the biasing member 56 to move the shuttle member 30 to its rest position.

The arrangement described above is particularly useful in controlling movement of relatively simple mechanical systems, such as deployment of a compartment of a trailer or an awning. The bi-directional rotation of pump permits a simple DC reversing motor to be utilised and the provision of the hydraulically actuated shuttle valve avoids the need for additional controls.

Although the invention has been described with reference to certain specific embodiments, various modifications thereof will be apparent to those skilled in the art without departing from the spirit and scope of the invention as outlined in the claims appended hereto.

What is claimed is:

1. A hydraulic control circuit for a hydraulic actuator, said circuit including a bi-directional pump to transfer fluid between a reservoir and a valve controlling movement of said actuator, said pump having a pair of ports and operable in a first mode where ingress of fluid from said reservoir to said pump is provided at one of said ports and egress of fluid from said pump to said valve is provided at the other port and operable in a second mode where ingress of fluid is provided at said other port and egress is provided at said one port, said valve having a first position when said pump is in said first mode in which said other port is in fluid communication with one side of said actuator and an other side of said actuator is in fluid communication with said reservoir to induce movement of said actuator in a first direction, and having a second position when said pump is in said second mode in which said one port is in fluid communication with the other side of said actuator and said one side is in fluid communication with said reservoir to induce movement in a second direction, wherein fluid expelled from said actuator by movement of said actuator returns to said reservoir prior to delivery to a respective one of said ports of said pump.

2. A circuit according to claim 1 wherein said valve has a third position in which flow to or from said actuator is inhibited when said pump is not operating.

3. A circuit according to claim 2 wherein said valve is biased to said third position.

4. A circuit according to claim 3 wherein said valve is a spring centred shuttle valve having a pair of lands controlling flow to outlet ports in fluid communication with said actuator.

5. A circuit according to claim 4 wherein said valve includes a drain port positioned between said lands and in fluid communication with said reservoir.

6. A circuit according to claim 5 wherein said valve has a pair of inlet ports in fluid communication with respective ones of said pump ports, said lands being interposed between said return ports and said inlet ports.

7. A circuit according to claim 6 wherein said inlet ports extend to respective inlet chambers containing an end of said spool whereby fluid in said inlet chambers acts on said spool to move it toward one of said first and second positions.

8. A circuit according to claim 7 wherein springs are located in said inlet chambers to bias said spool to said third position.

9. A circuit according to claim 1 wherein said valve is moved between said first position and said second position by pressure of hydraulic fluid delivered by a respective one of said ports.

10. A circuit according to claim 1 wherein respective check valves are interposed between each of said ports and said reservoir to inhibit flow of pressurized fluid supplied by said pump to said reservoir.

11. A hydraulically actuated shuttle valve having a body with a pair of supply ports, and a drain port located between said supply ports, a spool located in said body and having a pair of lands, each associated with a respective one of said supply ports to control flow therethrough, a pair of inlet ports to supply pressurized fluid to said spool to act on opposite ends of said spool and induce movement to either a first position in which one of said inlet ports is in fluid communication with one of said supply ports and said other supply port is in fluid communication with said drain or a second position in which said other inlet port is in fluid communication with said other supply port and said one supply port is in fluid communication with said drain.

12. A valve according to claim 11 wherein said spool is biased to a third position in which flow between said inlet ports and said supply ports is inhibited.

13. A valve according to claim 12 wherein said spool is biased by mechanical spring.

14. A valve according to claim 13 wherein a pair of springs are located in respective inlet chambers and act on opposite ends of said spool.

15. A hydraulically actuated shuttle valve comprising a body having a plurality of ports, said plurality of ports consisting of a first and second supply port, a drain port located between said first and second supply port, and a first and second inlet port;

a spool located in said body and having a pair of lands, each said land associated with a respective first and second supply port to control flow there through, wherein said first and second inlet ports supply pressurized fluid to said spool to act on opposite ends of said spool and induce movement to either a first position or a second position;

wherein in said first position said first inlet port is in fluid communication with said first supply port and said second supply port is in fluid communication with said drain port; and wherein in said second position said second inlet port is in fluid communication with said second supply port and said first supply port is in fluid communication with said drain port.

16. A valve according to claim 15 wherein said spool is biased to a third position in which flow between said inlet ports and said supply ports is inhibited.

17. A valve according to claim 16 wherein said spool is biased by a mechanical spring.

18. A valve according to claim 17 wherein a pair of springs are located in respective inlet chambers and act on opposite ends of said spool.

* * * * *